Nov. 10, 1964    R. H. THOMPSON    3,156,005
WEASAND MEAT SPLITTER AND PULLER
Filed June 6, 1962    3 Sheets-Sheet 1
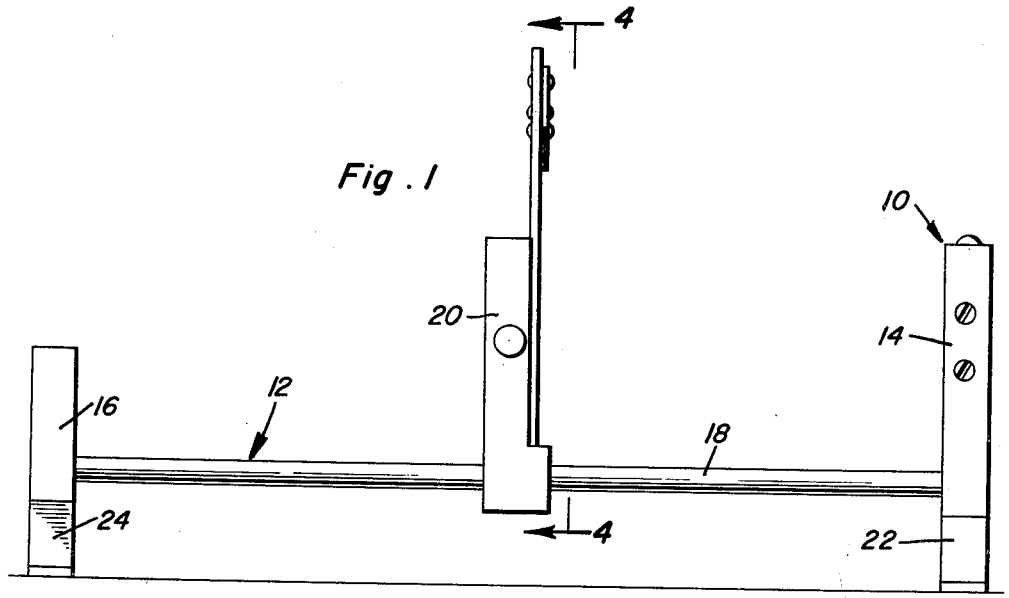
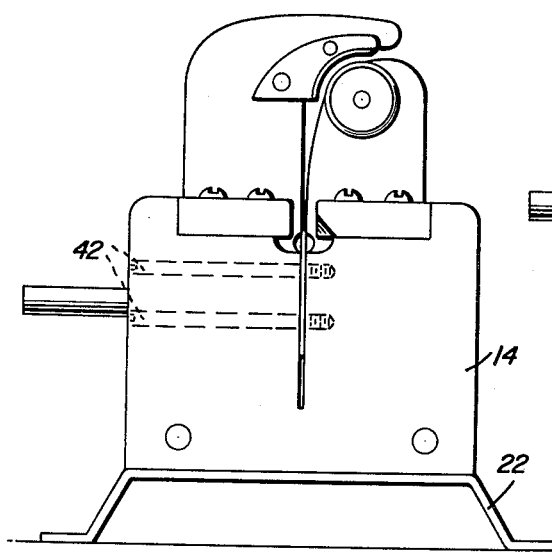
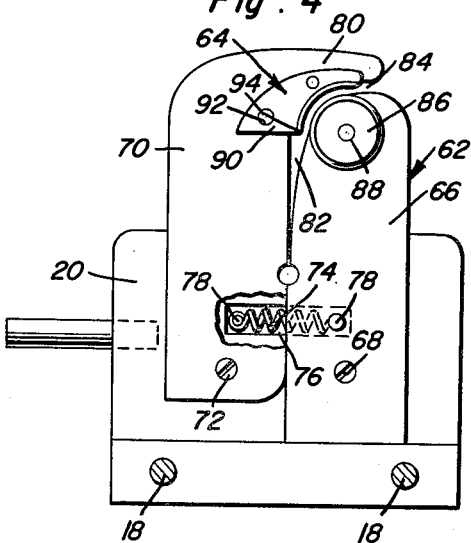
Rogild H. Thompson
INVENTOR.

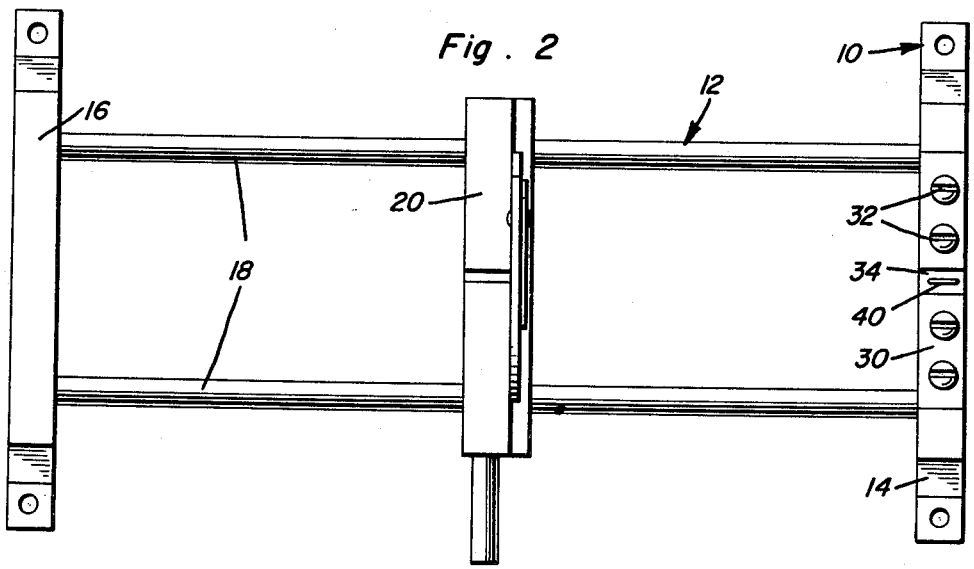
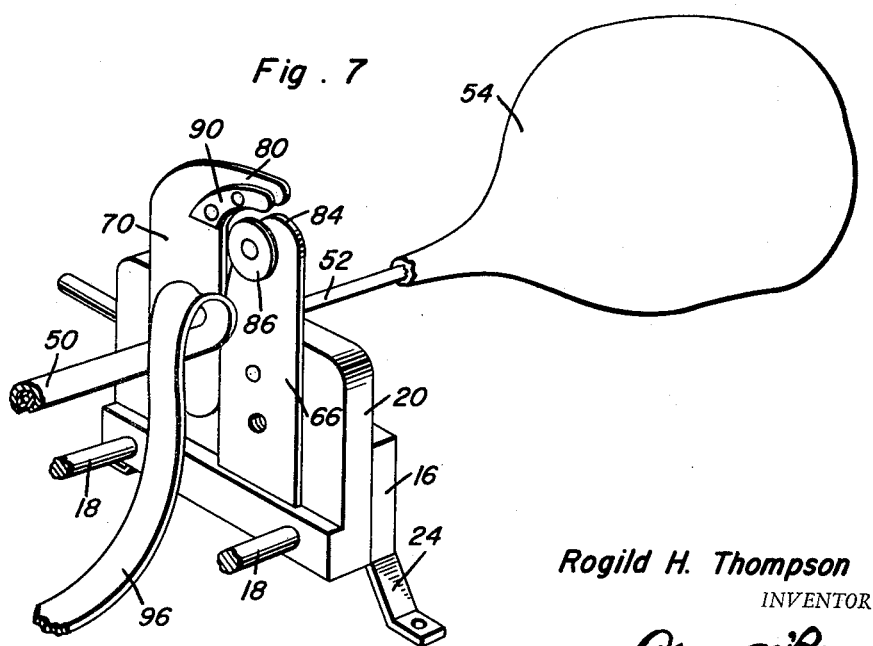
Rogild H. Thompson
INVENTOR.

Nov. 10, 1964 R. H. THOMPSON 3,156,005
WEASAND MEAT SPLITTER AND PULLER
Filed June 6, 1962 3 Sheets-Sheet 3
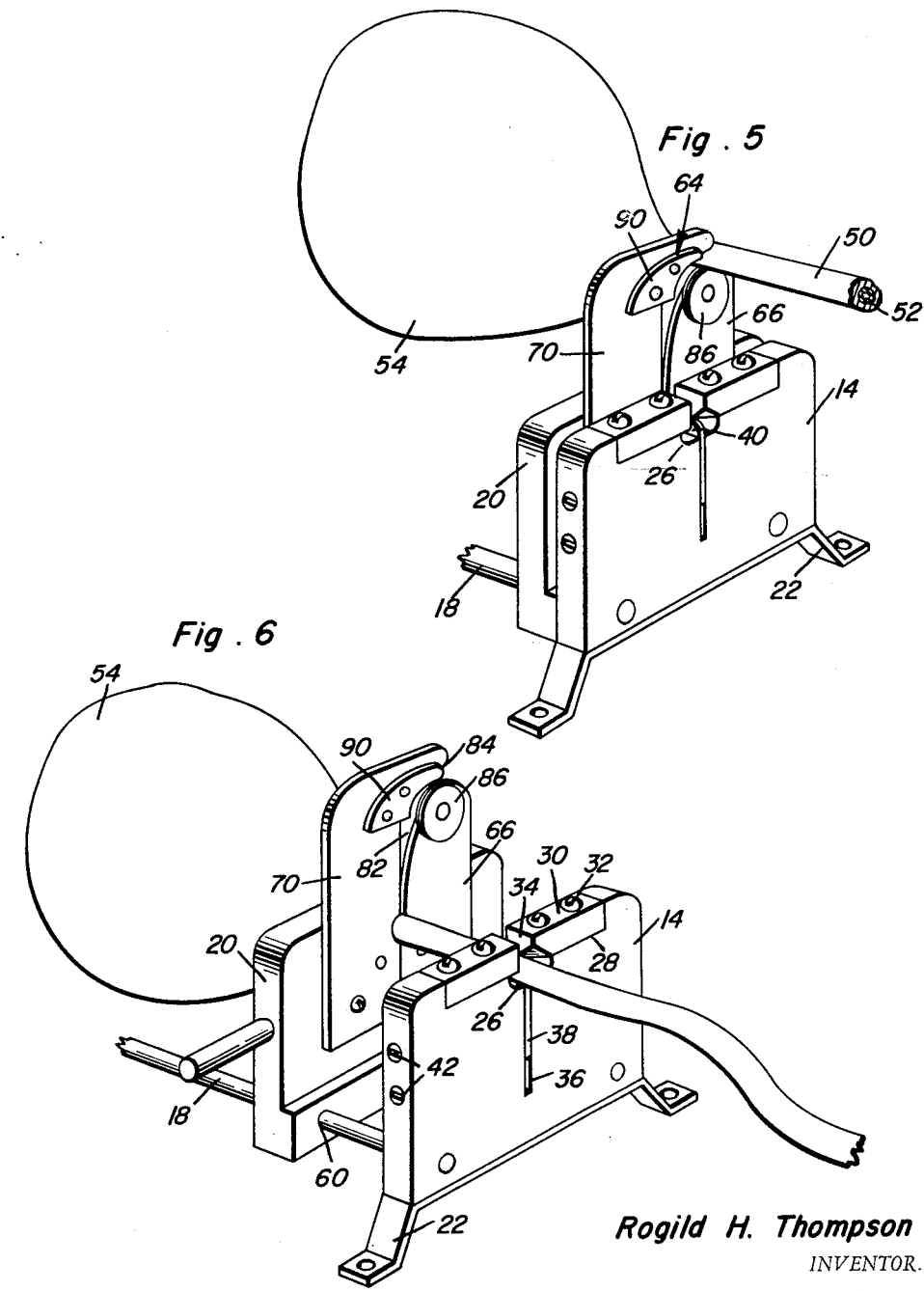
Rogild H. Thompson
INVENTOR.

United States Patent Office 3,156,005
Patented Nov. 10, 1964

3,156,005
WEASAND MEAT SPLITTER AND PULLER
Rogild H. Thompson, R.R. 2, Glenville, Minn.
Filed June 6, 1962, Ser. No. 200,506
7 Claims. (Cl. 17—1)

This invention comprises a novel and useful weasand meat splitter and puller and more particularly pertains to an apparatus and a method to effect an expeditious and economical separation of the weasand meat from the weasand sinew or gristle and from the stomach of animal carcasses.

The weasand or throat of the carcasses of hogs as well as of other animals has a useful nutrient value and may be beneficially employed in various meat preparations. Although especially useful for the recovery of weasand meat from pork carcasses, it will be appreciated that this invention also is useful for recovering this meat from the throat portions of other animals.

In modern hog butchering plants the carcasses are processed at a relatively high rate in a continuous manner of from 240 to 1000 head per hour or more. Any method therefore of recovering weasand meat which tends to slow down the rate of processing hog carcasses is of course highly undesirable. Further, the yield of recoverable weasand meat from hog carcasses is about 200 pounds per 3000 head of hogs. Under present modern methods it is not considered feasible to effect any extensive recovery of this weasand meat in a hog processing plant.

Present conventional methods for attempting the recovery of weasand meat require three operations as follows. First, there is the insertion or cutting of the weasand meat without severing the inner sinew or gristle of the weasand in order to insert a puller in this severed region. Second, there is required the operation of longitudinally splitting the weasand meat from the severed area to the end of the weasand. Third, there is required a pulling operation by which the split and severed weasand meat is pulled and stripped from the inner sinew or gristle of the weasand. The performing of these steps manually is obviously too slow to keep up with the large number of hogs being processed without delaying the latter and further requires a considerable amount of time thus further running up the cost to a point where recovery of the weasand meat is uneconomical.

It is therefore the primary object of this invention to provide a device and a method which will greatly reduce the time required to strip the weasand meat from the hogs.

A further object of the invention is to provide a device in accordance with the preceding object which will enable the use of power operating means thereby greatly reducing the labor required for this operation.

A still further object of the invention is to provide a device which will enable the obtaining of a highly uniform precision in the stripping of the weasand meat from the gristle or sinew of the weasand.

A still further object of the invention is to provide a device in compliance with the preceding objects which will enable the weasand meat recovery to be effected as a continuous operation and which is coordinated with the normal rate of processing hog carcasses in a packing plant.

A still further object of the invention is to provide a device which will reduce the time and labor required to effect the desired results through a combining of the severing and pulling operations in an improved manner.

As a prerequisite to the application of this method and apparatus to the recovery of weasand meat it is understood that the viscera has been removed from the carcass of the hog, that the weasand still attached to the stomach is separated from the viscera and from the esophagus. Accordingly, in the attached drawings there is illustrated the application of this invention to a hog weasand with the stomach attached thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a preferred form of apparatus in accordance with this invention;

FIGURE 2 is a top plan view of the apparatus of FIGURE 1;

FIGURE 3 is an end elevational view from the right end of FIGURE 1 and showing in elevation both the carriage with its holding and cutting means and the splitting means of the invention;

FIGURE 4 is a view, with a portion broken away, in vertical transverse section taken substantially upon the plane indicated by the section line 4—4 of FIGURE 1 and showing further details of the holding and cutting means of the carriage;

FIGURE 5 is a fragmentary perspective view showing both the splitting and the carriage means in juxtaposition to each other in readiness for beginning the first phase of the method in accordance with this invention;

FIGURE 6 is a view similar to FIGURE 1 but showing the manner in which the carriage and holding means are moved in order to effect the longitudinal splitting of the weasand by the splitter of the invention; and FIGURE 7 is a further view but showing the carriage and holding means at the opposite end of the support frame of the device upon the completion of the splitting means and showing the beginning of the stripping operation.

In the accompanying drawings, the numeral 10 designates generally a preferred form of apparatus for carrying out the principles of this invention and comprises as its main components a suitable support frame 12 having secured at one end portion thereof a weasand splitter 14 and an end piece 16 at its other end. Referring especially to FIGURE 2 it will be seen that the support frame 12 includes a pair of parallel guide rods 18 which are fixedly secured to the splitter 14 and end piece or member 16 to form therewith a rigid assembly. Supported upon and slidably movable upon the guide rods 18 is a carriage 20 which thus is movable towards and from the splitter 14. Conveniently, the splitter 14 and end piece 16 may be provided with supporting legs as at 22 and 24.

Attention is directed now to the construction of the weasand splitter 14, for which reference is now made particularly to FIGURES 5 and 6. As will be observed, the splitter 14 comprises a generally flat and plate-like body which constitutes an end member of the support frame, and upon its top edge is provided with a downwardly extending recess or notch 26. Recesses 28 are also provided in the top edge and opposite sides of this notch and receive therein closure plates 30 secured as by fastening screws 32 and which are spaced from each other to provide a throat 34 therebetween. Preferably the top edges of the closure plates 30 are flush with the top edges of the splitter 14 adjacent thereto.

From the bottom of the slot 26 there is further provided a downwardly extending slot or slit as at 36 and received therein is the shank 38 of a stationary knife blade having an upwardly projecting cutting portion 40 which is centrally disposed in the notch 26. As shown in FIGURE 3, retaining screws 42 are threaded in bores opening from one side edge of the splitter 14 to bear against the knife blade shank 38 to retain the knife blade in adjusted position. The knife blade is so positioned that its cutting portion will be centered in and extend upwardly into the throat 34 such a distance that it will be able to penetrate substantially completely the weasand meat 50 but will not penetrate or engage the central inner sinew or gristle 52 of the weasand, as will be more readily apparent from a consideration of FIGURES 5 and 7.

The opening of the throat 34 is sufficient to enable the entire weasand to be readily placed thereinto and to cause the weasand meat to be impaled upon the upper projecting knife portion 40 of the knife blade shank 38. It will now be apparent that when so placed, longitudinal movement of the weasand through the notch 26 of the weasand splitter 14 will produce a longitudinal slit in the weasand meat which, however, will leave the inner sinew or gristle 52 intact and attached to the stomach 54 of the hog carcass.

Reference is next made more particularly to the movable carriage 20. It will be seen that this member likewise includes a generally flat plate-like body which is apertured as at 60 at its lower portion to be slidably received upon the rods 18 of the support frame. Thus this carriage is mounted in an erect position and is slidably guided upon the rods 18 for movement towards and from the splitter 14 and the end member 16. At this point it should be understood that this movement may be effected manually or by power operating means such as fluid pressure cylinder and pistons, electric motors, or any other controllable power agent.

Mounted upon the carriage in an advantageous and improved manner is a holding means indicated generally by the numeral 62 and a knife means indicated generally by the numeral 64, the relationship between these elements being preferably as shown in FIGURES 4, 6 and 7.

The holding means 62 includes a pair of relatively movable cooperating plates. Thus, there is provided a stationary upstanding plate 66 secured as by fastening screws 68 to one face of the carriage 20, and a cooperating relatively movable plate 70 pivoted to the carriage as by a fastener 72 and movable towards and from the stationary plate. A tension spring as at 74 is secured in cooperating complementary aligned chambers or recesses 76 formed in the two plates 66 and 70 as by means of anchor pins 78 and yieldingly urges the two plates towards each other.

As will be noted from the drawings, the plate 70 at its upper end is provided with a laterally extending portion 80 which overhangs the corresponding portion of the plate 66 and the adjacent edges of these two plates provides a space 82 therebetween having a downwardly tapering and narrowing portion. The inlet to this space indicated by the numeral 84 is of sufficient width to enable the weasand to be readily inserted thereinto, but at the tapering portion of the space there is just sufficient clearance to receive therein the inner sinew or gristle 52 of the weasand but not the weasand meat 50.

Mounted upon the adjacent upper portions of the two plates 66 and 70 is the knife means 64 consisting of a circular rotary knife member 86 mounted upon a pivot 88 carried by the plate 66 and which projects into the space 82. Cooperating with the rotary knife 86 is a stationary knife 90 secured as by fasteners 92 to the movable plate 70 and having an arcuate knife edge 94 which extends circumferentially about a portion of the circumference of the rotary knife 86. The shape of the knife 94 is preferably such and the knife is so disposed that as the weasand is pushed into the opening 84, and moved between the two knives, the more restricted space between the knives will gradually completely sever the weasand meat and form a complete circular cut of the latter, but will not sever or cut the sinew 52. Consequenlty, as the weasand is pushed through the knives it will be severed and the weasand meat will be separated at this cut to lie on opposite sides of the two plates whereas the weasand sinew or gristle will move downwardly through the tapering portion of the space 82. In this position, the surfaces of the holding plates 66 and 70 will abut the adjacent ends of the weasand meat at their circular severed portion for a purpose to be subsequently apparent.

The operation of this apparatus and the method of splitting weasand meat which may be performed thereby is as follows.

Assuming that the weasand still attached to the stomach 54 has been separated from the hog viscera, the present invention may be then applied. With the carriage 20 moved manually or by the previously mentioned power means into engagement with or in sufficiently close proximity to the splitter 14, the weasand is passed into the knife means at the juncture of the weasand with the stomach. As previously mentioned during this inward passage, the cooperating rotary and stationary knives will perform a circular severing of the weasand meat while leaving the inner sinew or gristle intact. The start of this operation is shown in FIGURE 5. It being assumed that the weasand is now pushed inwardly and downwardly of the knife means, the weasand meat will be circularly severed and will be moved to the bottom of the space 82, with the severed portions of the weasand on opposite sides of the annular cut being positioned on opposite sides of the holding plates 66 and 70. At the same time, the weasand is pushed down through the throat 34 into the notch 24 and is impaled upon the knife blade cutting portion 40.

With the weasand being thus properly applied to the apparatus, the carriage 20 is then either manually or by power means moved upon its guide raids 18 away from the splitter 14 and towards the end plate 16. During this movement, the stomach 54 to which the inner sinew 52 is still attached is held in the holding means. Consequently, that portion of the weasand on the other side of the annular cut in the weasand meat is pulled or drawn through the recess 26 causing the impaled knife blade portion 40 to provide a longitudinal slit along the length of the weasand meat.

The initiation of this operation is shown in FIGURE 6 wherein the initial part of the movement of the carriage away from the slitting member 14 has been depicted. Upon the completion of this stroke, so that the carriage 20 is adjacent to the end plate 16 as shown in FIGURE 7 or substantially adjacent thereto, so that all of the weasand has been split, the stomach 54 is then grasped and is pulled by manual or other means away from the carriage and end plate. The initiation of this pulling movement is shown in FIGURE 7. Since the weasand gristle or sinew 52 is still intact with the stomach, and extends the full length of the weasand although the weasand meat is slit, the sinew or gristle is pulled out of and from the split weasand meat so that the latter is peeled therefrom into a flat strip as indicated by the numeral 96 in FIGURE 7. After the weasand meat has been stripped from the weasand sinew, the latter and the stomach are discarded and the weasand meat is recovered for use. Thereupon the carriage is moved back to its initial position in readiness for the next weasand meat splitting operation.

Although the apparatus disclosed herein is specifically adapted to perform the method of stripping weasand meat, it will be evident that other apparatuses of different character can be provided to effect the same method of operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is as new is as follows:

1. A weasand meat remover comprising a support frame having a weasand meat splitter mounted thereon, a carriage mounted upon said support frame for movement towards and from said splitter, knife means on said carriage for producing a circular cut entirely through the weasand meat and completely about but without cutting the weasand inner sinew or gristle, holding means on said carriage for slidably embracing said inner sinew or gristle and abutting the weasand meat in said circular cut for stripping the split meat from the sinew or gristle when the latter is drawn through said holding means, said holding means comprising a pair of cooperating relatively fixed and movable plates with the adjacent faces of said plates defining a space between which a weasand sinew or gristle may be moved, said space having a portion tapering in width to a distance adapted to sever weasand meat and adapted to permit passage of a weasand sinew or gristle without severing.

2. The combination of claim 1 wherein said knife means is disposed in said space whereby to sever the weasand meat prior to passage of the unsevered weasand sinew or gristle into said tapering portion.

3. A weasand meat remover comprising a support frame having a weasand meat splitter mounted thereon, a carriage mounted upon said support frame for movement towards and from said splitter, knife means on said carriage for producing a circular cut entirely through the weasand meat and completely about but without cutting the weasand inner sinew or gristle, holding means on said carriage for slidably embracing said inner sinew or gristle and abutting the weasand meat in said circular cut for stripping the split meat from the sinew or gristle when the latter is drawn through said holding means, said knife means including cooperating stationary and rotary knife blades through which a weasand is adapted to be passed with the minimum spacing between said blades being sufficient to sever the weasand meat but insufficient to sever the weasand sinew or gristle.

4. A weasand meat remover comprising a support frame having a weasand meat splitter mounted thereon, a carriage mounted upon said support frame for movement towards and from said splitter, knife means on said carriage for producing a circular cut entirely through the weasand meat and completely about but without cutting the weasand inner sinew or gristle, holding means on said carriage for slidably embracing said inner sinew or gristle and abutting the weasand meat in said circular cut for stripping the split meat from the sinew or gristle when the latter is drawn through said holding means, said holding means comprising a pair of relatively movable plates, spring means connected to said plates and yieldingly urging them towards each other.

5. A weasand meat remover comprising a support frame having a weasand meat splitter mounted thereon, a carriage mounted upon said support frame for movement towards and from said splitter, knife means on said carriage for producing a circular cut entirely through the weasand meat and completely about but without cutting the weasand inner sinew or gristle, holding means on said carriage for slidably embracing said inner sinew or gristle and abutting the weasand meat in said circular cut for stripping the split meat from the sinew or gristle when the latter is drawn through said holding means, said splitter comprising a body having a weasand receiving recess and a splitter blade mounted in said recess and positioned and arranged to penetrate the weasand meat but not the sinew or gristle.

6. A weasand meat remover comprising a supporting frame, a weasand meat splitter carried by said frame, carriage means movably mounted on the frame, knife means on the carriage for forming a cut through the weasand means without cutting the weasand inner sinew or gristle, means on the carriage for slidably receiving the inner sinew and gristle and abutting the weasand meat in said cut with such means forming an abutment for the weasand meat for stripping the split weasand meat from the sinew or gristle when the latter is pulled through said meat, said means slidably receiving the inner sinew or gristle including a space having tapering edges, said knife means including a pair of opposed knifes at the entrance to the space for cutting the weasand meat as the weasand meat with the inner sinew therein is forced between the opposed knives.

7. The structure as defined in claim 6 wherein said splitter includes a notch for receiving the weasand, a slitting knife disposed in the notch centrally thereof for forming the longitudinally extending slit along the length of the weasand meat without cutting into the inner sinew or gristle thus enabling the weasand meat to be stripped from the inner sinew or gristle when the knife means on the carriage forms a cut in the weasand meat and the weasand meat is pulled longitudinally through the sliding means for the inner sinew or gristle.

References Cited in the file of this patent

UNITED STATES PATENTS

| | | |
|---|---|---|
| 2,139,704 | Thompson et al. | Dec. 13, 1938 |
| 2,463,157 | Deitrickson | Mar. 1, 1949 |
| 2,505,964 | Hincks | May 2, 1950 |
| 2,701,386 | Strickler | Feb. 8, 1955 |
| 2,929,285 | Gulemi | Mar. 22, 1960 |
| 2,929,286 | Blakely | Mar. 22, 1960 |